(12) United States Patent
Grabarnik et al.

(10) Patent No.: US 8,285,698 B2
(45) Date of Patent: Oct. 9, 2012

(54) SECURING SEARCH QUERIES

(75) Inventors: Genady Grabarnik, Scarsdale, NY (US); Moon J. Kim, Wappingers Falls, NY (US); Lev Kozakov, Stamford, CT (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/619,759

(22) Filed: Nov. 17, 2009

(65) Prior Publication Data

US 2011/0119253 A1    May 19, 2011

(51) Int. Cl.
G06F 17/30    (2006.01)
(52) U.S. Cl. .......................................... 707/706
(58) Field of Classification Search .............. 707/3, 706; 705/14; 709/223
See application file for complete search history.

(56) References Cited

U.S. PATENT DOCUMENTS

| | | | |
|---|---|---|---|
| 6,928,428 B1 | 8/2005 | De Vries | |
| 7,171,413 B2 | 1/2007 | Puz et al. | |
| 2004/0128259 A1* | 7/2004 | Blakeley et al. | 705/74 |
| 2005/0120233 A1 | 6/2005 | Halcrow et al. | |
| 2006/0015401 A1* | 1/2006 | Chu et al. | 705/14 |
| 2006/0248061 A1* | 11/2006 | Kulakow et al. | 707/3 |
| 2007/0143271 A1 | 6/2007 | Yuval et al. | |
| 2009/0077060 A1 | 3/2009 | Sermersheim et al. | |

OTHER PUBLICATIONS

Oracle Secure Enterprise Search product data sheet. Author not referenced. Jan. 9, 2007, pp. 1-9.
Back, E., "Reverse engineering techniques explained #01: string search," Medialab.freaknet.org, 1998, 8 pages.
AOL Gate: Search Query Data Scandal. Author unknown. Aug. 7, 2006, 2 pages.

* cited by examiner

*Primary Examiner* — Etienne Leroux
(74) *Attorney, Agent, or Firm* — William E. Schiesser; Ronald A. D'Alessandro; Keohane & D'Alessandro PLLC

(57) ABSTRACT

In general, the present invention protects actual search queries submitted to web search engines using a set (i.e., at least one) of supplemental queries (hereinafter referred to as securing search queries). As a result, collections of search queries will not form statistically stable categories, and will not disclose the search subject. Any hits resulting from securing search queries will be filtered from results that are returned to the requestor. In addition, the securing search queries can be associated with protective Internet Protocol addresses to reduce the possibility of the requestor of the actual search query to be identified.

24 Claims, 5 Drawing Sheets

SECURING SEARCH QUERIES

CROSS-REFERENCE TO RELATED APPLICATION

This application is related in some aspects to the commonly owned and co-pending U.S. patent application entitled "Search Term Security", having a Ser. No. 12/617,160, filed on Nov. 12, 2009.

FIELD OF THE INVENTION

The present invention generally relates to search query security. Specifically, the present invention relates to the masking/securing of actual search queries with supplemental search queries.

BACKGROUND OF THE INVENTION

When search queries are sent to a search engine (e.g., web), the search engine collects and stores query terms for later mining. This type of storing and data mining might create a security risk to users working, for instance, on new intellectual property. Categorization of collections of search queries might provide enough information for a search company to reverse engineer the subject of the search and associate it with the requester's IP address. These types of stored search strings by a search company constitute a breach of corporate security and cannot be cured by working within a company Intranet or company firewalls.

SUMMARY OF THE INVENTION

In general, the present invention reduces the efficiency of the query mining performed by web search engines by securing actual search queries behind a set (i.e., at least one) of supplemental queries (hereinafter referred to as securing search queries). As a result, collections of search queries will not form statistically stable categories, and will not disclose the search subject. Any hits resulting from securing search queries will be filtered from results that are returned to the requestor. In addition, the securing search queries can be associated with protective Internet Protocol addresses to reduce the possibility of the requestor of the true search query to be identified and facilitate filtering of search results.

The first aspect of the present invention provides a method for securing search queries, comprising: receiving a search query; analyzing the search query to determine a subject matter of the search query; generating a set of securing search queries that have the subject matter of the search query; submitting the search query and the set of securing search queries to a search engine; and filtering results received from the search engine to remove any hits that resulted from the set of securing search queries.

A second aspect of the present invention provides a computer system for securing search queries, comprising: at least one processing unit; memory operably associated with the at least one processing unit; and a utility stored in the memory and executable by the at least one processing unit, the utility comprising: a module for receiving a search query; a module for analyzing the search query to determine a subject matter of the search query; a module for generating a set of securing search queries that have the subject matter of the search query; a module for submitting the search query and the set of securing search queries to a search engine; and a module for filtering results received from the search engine to remove any hits that resulted from the set of securing search queries.

A third aspect of the present invention provides a computer readable medium containing a program product for securing search queries, the computer readable medium comprising program code for causing a computer system to: receive a search query; analyze the search query to determine a subject matter of the search query; generate a set of securing search queries that have the subject matter of the search query; submit the search query and the set of securing search queries to a search engine; and filter results received from the search engine to remove any hits that resulted from the set of securing search queries.

A fourth aspect of the present invention provides a method for deploying a system for securing search queries, comprising: providing computer infrastructure being operable to: receive a search query; analyze the search query to determine a subject matter of the search query; generate a set of securing search queries that have the subject matter of the search query; submit the search query and the set of securing search queries to a search engine; and filter results received from the search engine to remove any hits that resulted from the set of securing search queries.

BRIEF DESCRIPTION OF THE DRAWINGS

These and other features of this invention will be more readily understood from the following detailed description of the various aspects of the invention taken in conjunction with the accompanying drawings in which.

Figure 1:
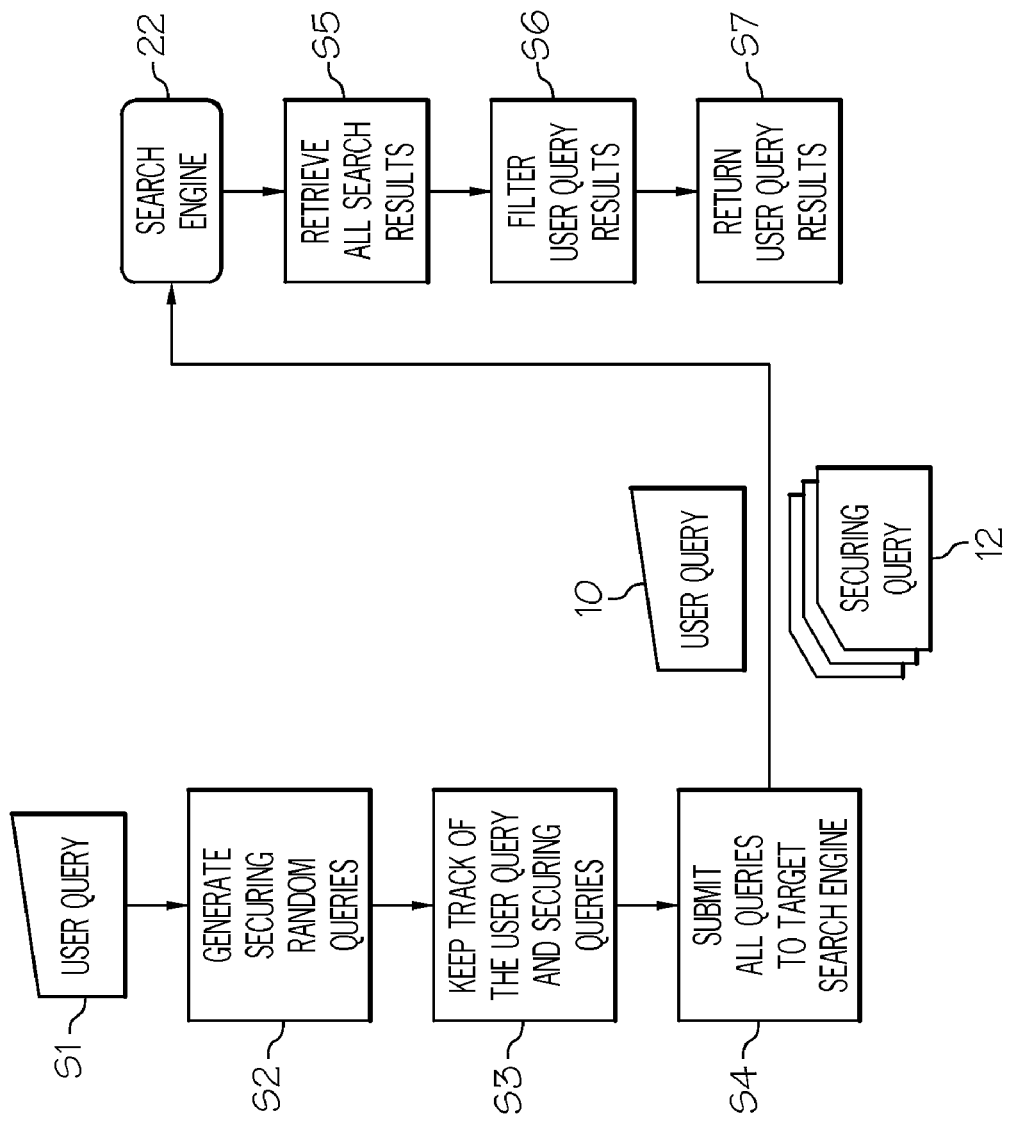
FIG. 1 shows a method flow diagram for securing search queries according to an aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As indicated above, the present invention reduces the efficiency of the query mining performed by web search engines by securing actual search queries behind a set (i.e., at least one) of supplemental search queries (hereinafter referred to as securing search queries). As a result, collections of search queries will not form statistically stable categories, and will not disclose the search subject. Any hits resulting from securing search queries will be filtered from results that are returned to the requestor. In addition, the securing search queries can be associated with protective Internet Protocol addresses to reduce the possibility of the requestor of the true search query to be identified.

In a typical embodiment, the system generates a set (at least one) of (random) supplemental/masking/securing search queries from predefined subject matter domains to secure an original or authentic search query. This set of securing queries will be submitted along with the actual query to protect the actual query in a bunch of masking queries and impede the tracking and analysis of the actual requested information on the side of a web search engine. In addition, the system can keep track of all submitted queries, including the actual user query and the generated masking queries. The search results are filtered based on query tracking to return hits of the actual query to the requester and discard hits resulting from any masking query.

Referring now to FIG. 1, a high level method flow diagram of this process is depicted. As shown in step S1, an actual/search query 10 is received (e.g., from a user, from another computer, etc.). In step S2 a set of securing search queries 12 (referred to in plural at various points of this disclosure for convenience purposes only. This type of plural usage is not intended to be limiting but are generated based on randomly selected subject matter domains or their combination. In general, the generation of the set of securing search queries 12 is performed based on an analysis of search query 10. Specifically, a subject matter of the search query is ascertained, and masking/supplemental queries are generated that have that subject matter. In step S3, the system keeps track of all queries, including the actual user query and the generated masking queries. In step S4 all queries 10 and 12 are submitted to a target search engine 22. In step S5, search engine 22 returns search results for all submitted queries. In step S6, the search results are filtered to prevent any hits resulting from a securing search query 16 from being included in the results returned to the requestor in step S7.

Figure 2:
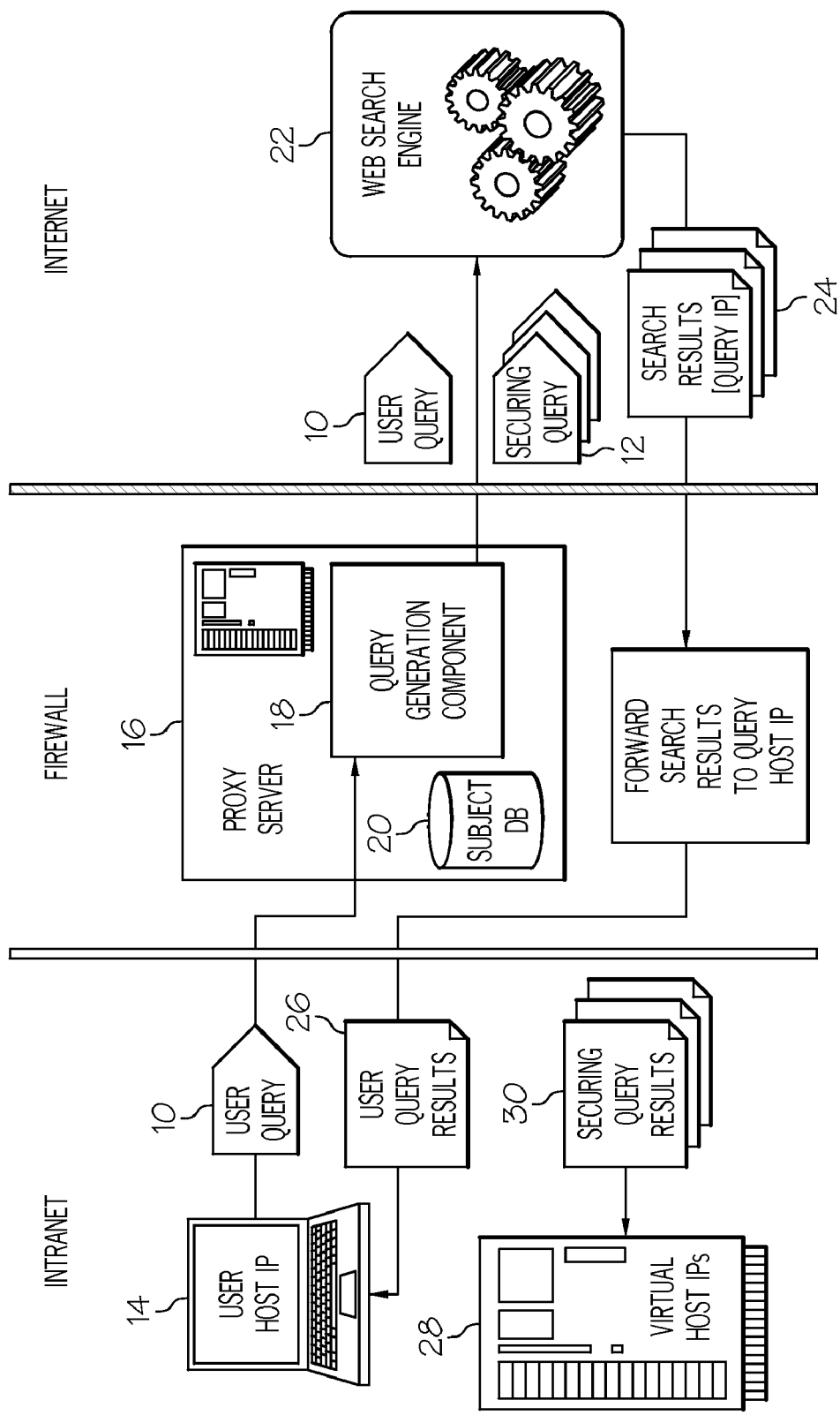
FIG. 2 shows an architectural diagram for securing search queries according to the present invention.

Below is only an illustrative example of how these steps could be implemented. For this example, reference is now made to FIGS. 2 and 3.

(1) A requestor 14 (e.g., intranet or internet user) enters search query 10 on a regular search page of the target Web Search Engine.

Optional: using special search page with additional 'secure' check box, provided by the Intranet application.

(2) A Proxy Server 16 intercepts search query 10.

Optional: only 'secure' search queries are intersected by Proxy Server 16.

Figure 3:
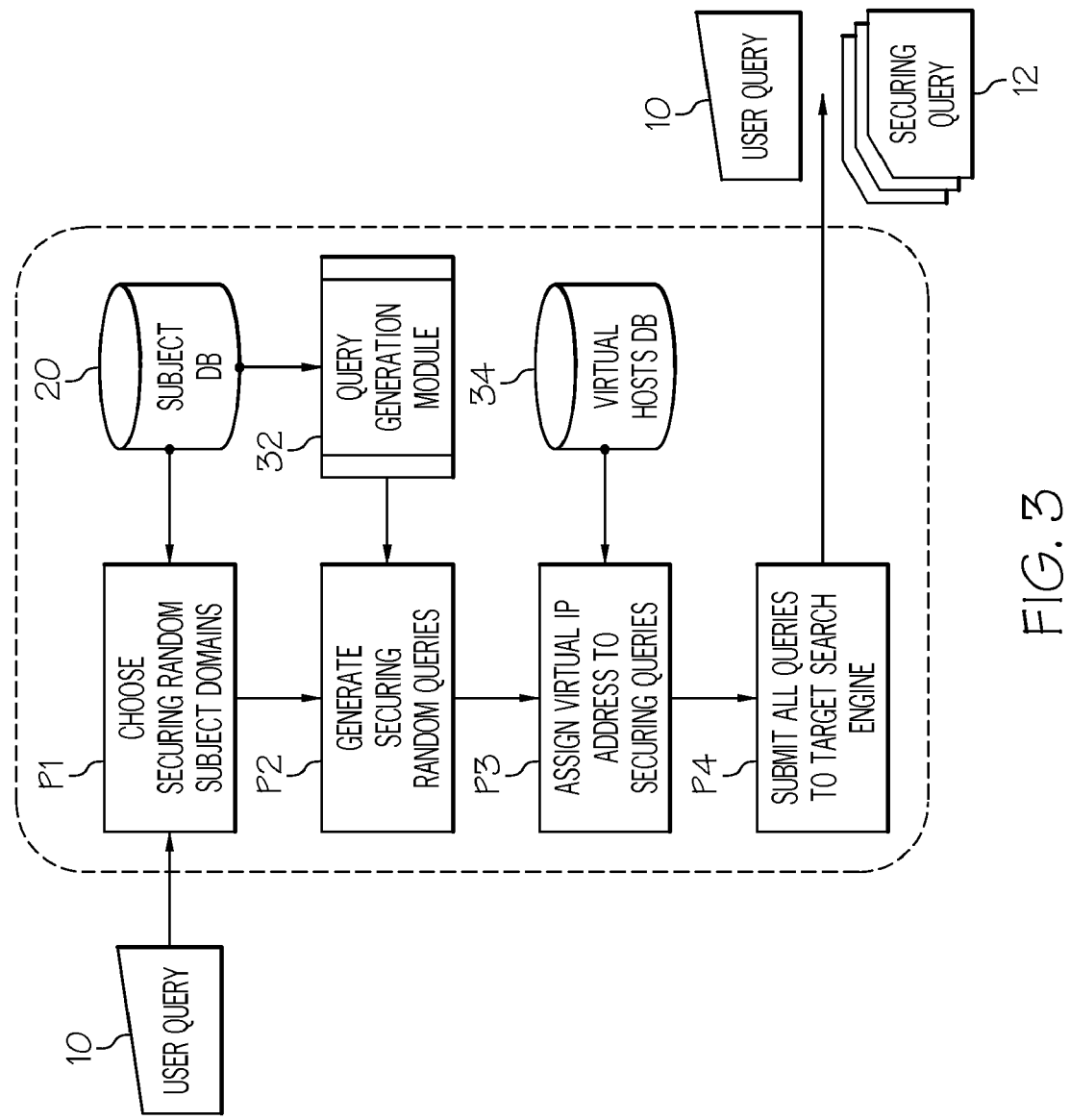
FIG. 3 shows a logical flow diagram for generating a set of masking queries according to the present invention.

(3) A query protection utility 18 running in Proxy Server 18, randomly selects additional masking subject matter domains from a database 20 of predefined subject matter domains 20 (step P1 in FIG. 3).

(4) Query generation module 32 (FIG. 3) of query protection utility 18 generates additional masking queries 12 for selected subject matter domains (step P2 of FIG. 3) by using combinations of domain-specific keywords (step P2 of FIG. 3).

(5) Query protection utility 18 assigns supplies generated masking queries 12 with virtual/dummy Internet Protocol (IP) addresses from the list of virtual/protective hosts in a database 34 or the like (step P3 of FIG. 3).

Optional: in order to make more difficult association of queries with requestor's IP, proxy server may use IP anonymization (mapping).

(6) All queries 10 and 12 are submitted to the target Web Search Engine 22 (step P4 of FIG. 3).

(7) Web Search Engine 22 returns all search results 24.

(8) A firewall (e.g., Intranet or Internet) forwards the search results 26 and 30 (actual and masking) back to the requestors 14 and 28 according to the Internet Protocol addresses associated with each query 10 and 12.

(9) Requestor 14 gets the actual search results 26.

(10) Search results 30 for additional (masking) queries are returned to virtual/dummy (existing or dummy) requestors 28.

Optional: virtual requestors may be implemented by using special Intranet server with multiple IP addresses. Each virtual requestor may imitate possible user actions on query results (opening pages, etc.).

Figure 4:
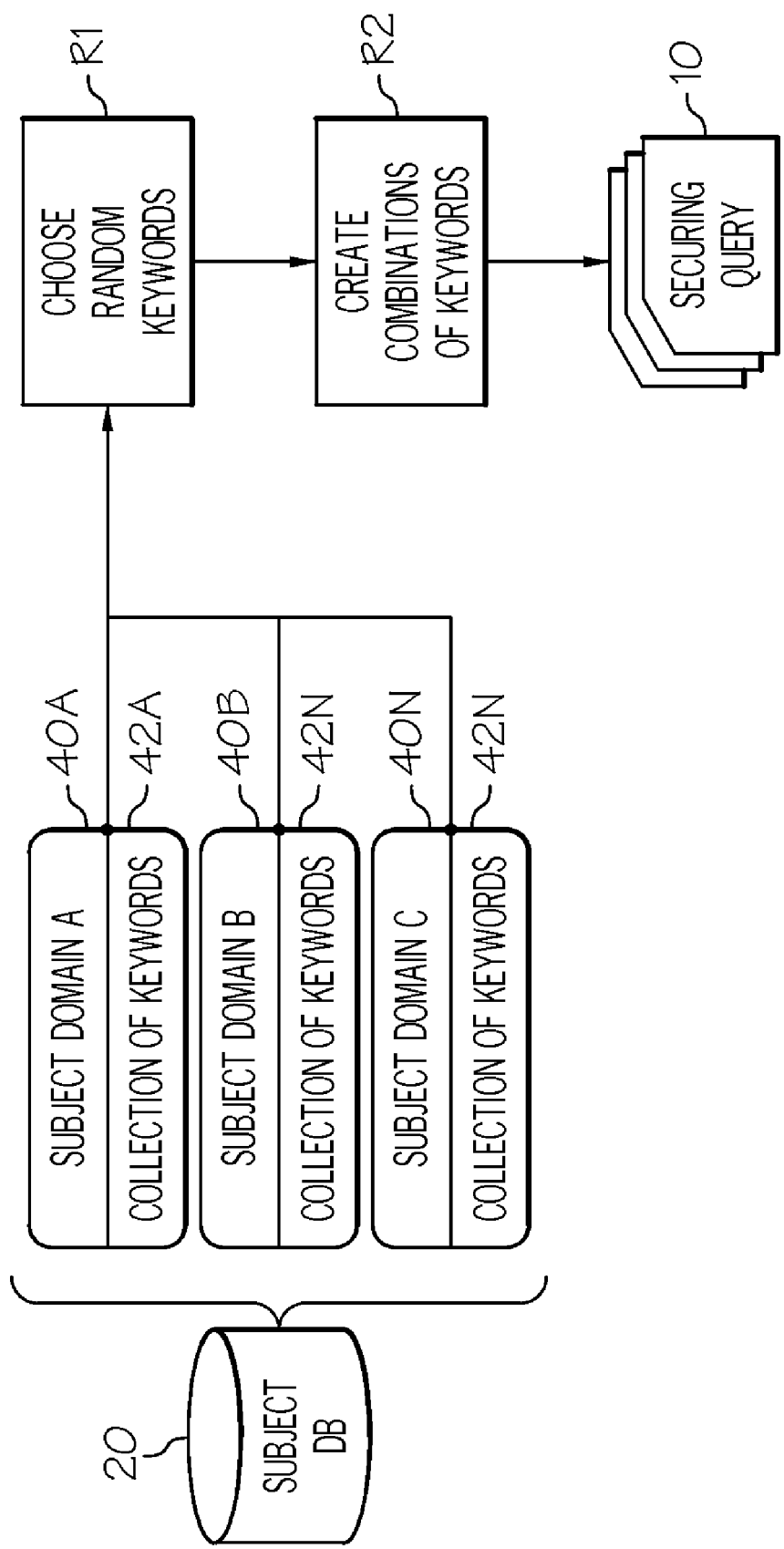
FIG. 4 shows a more detailed logical flow diagram for generating the set of masking queries according to the present invention.

Referring now to FIG. 4, a logical flow diagram of the subject matter-based masking query generation is shown. As depicted, subject matter database 20 can comprise any quantity of subject matter domains 40A-N. Each domain 40A-n is associated with a set or "collection" of keywords 42A-N. Once the subject matter of the user/actual query 10 has been ascertained, keywords for the corresponding subject matter domain 40A-N can be randomly chosen in step R1. These keywords or one or more combinations of these keywords will then be created in step R2 to yield the set of masking queries 12.

II. Computerized Implementation

Figure 5:
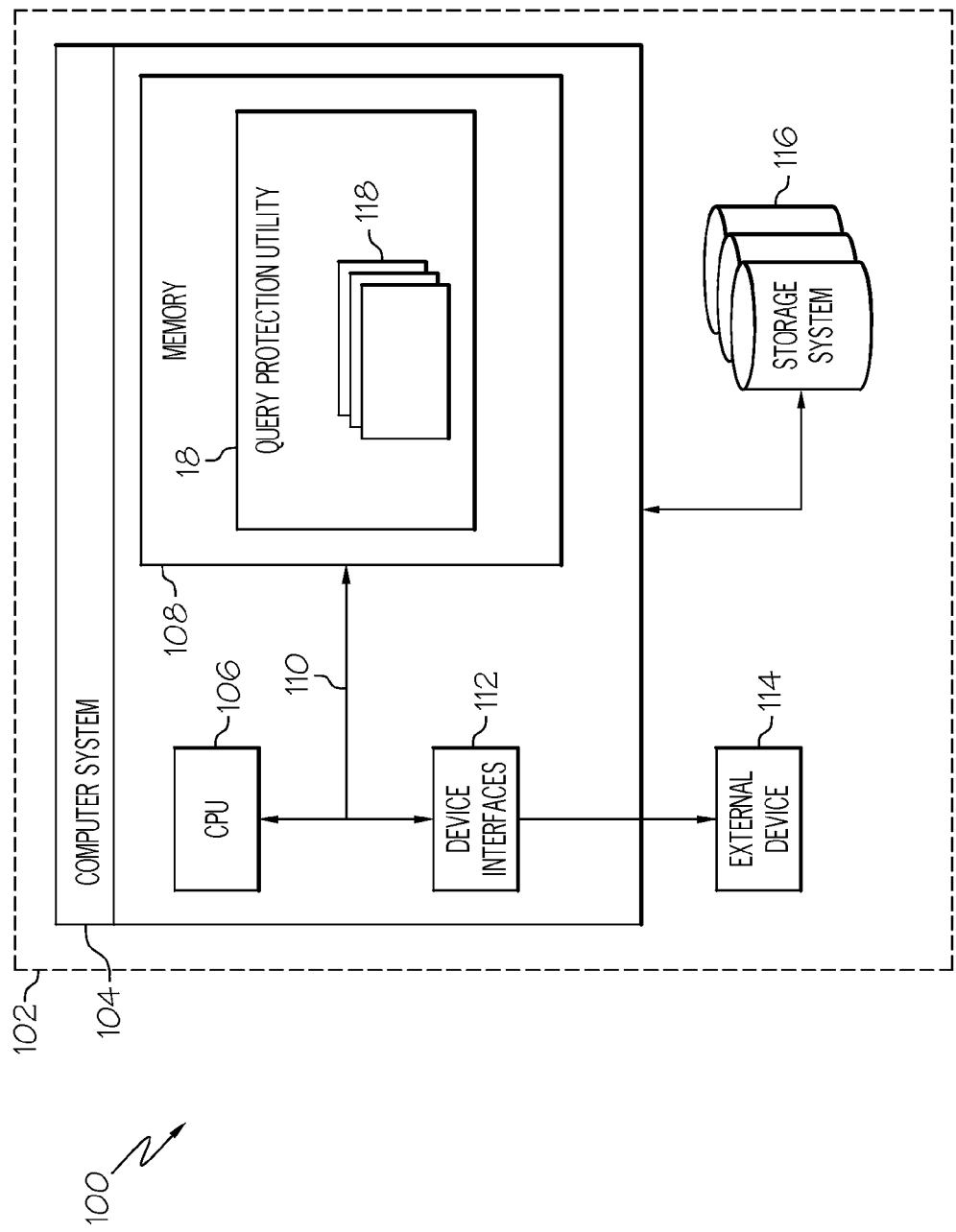
FIG. 5 shows a more specific computerized implementation for securing search queries according an aspect to the present invention.

Referring now to FIG. 5, a computerized implementation 100 of the present invention is shown. As depicted, implementation 100 includes computer system 104 (e.g., physical machine 30) deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and device interfaces 112. Further, computer system 104 is shown communicating with one or more external devices 106 that communicate with bus via device interfaces. In general, processing unit 106 executes computer program code, such as query protection utility 18, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Computer system 104 could also communicate with one or more external devices 114 such as a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 5 can be included in computer system 104.

Storage system 116 can be any type of system capable of providing storage for information under the present invention. To this extent, storage system 116 could include one or more storage devices (e.g., databases 20 and 34 of FIGS. 1-4), such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is query protection utility 18, which includes a set of modules 120. Set of modules 120 generally provide all functions of the present invention as described herein. Along these lines, set of modules 120 should be understood as including elements, components, modules, etc. of FIGS. 1-4.

While shown and described herein as a query protection and/or masking solution, it is understood that the invention further provides various alternative embodiments. For example, in one embodiment, the invention provides a computer-readable/useable medium that includes computer program code to enable a computer infrastructure to provide query protection and/or masking functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide query protection and/or masking functionality. In this case, the service provider can create, maintain, support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing query protection and/or masking functionality. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for securing search queries, comprising:
   receiving a search query;
   analyzing the search query to determine a subject matter of the search query;

generating a set of securing search queries that have the subject matter of the search query;
submitting the search query and the set of securing search queries to a search engine; and
filtering results received from the search engine to remove any hits that resulted from the set of securing search queries.

2. The method of claim 1, the generating comprising:
randomly choosing keywords related to the subject matter; and
creating at least one combination of the keywords.

3. The method of claim 2, the keywords being randomly chosen from a database having content related to the subject matter.

4. The method of claim 1, further comprising associating each of the set of securing search queries with at least one supplemental requestor.

5. The method of claim 4, further comprising returning the hits resulting from the set of securing search queries to a respective one of the at least one supplemental requestor.

6. The method of claim 1, further comprising making a requestor of the search queries and the set of securing search queries.

7. A computer system for securing search queries, comprising:
at least one processing unit;
memory operably associated with the at least one processing unit; and
a utility stored in the memory and executable by the at least one processing unit, the utility comprising:
a module for receiving a search query;
a module for analyzing the search query to determine a subject matter of the search query;
a module for generating a set of securing search queries that have the subject matter of the search query;
a module for submitting the search query and the set of securing search queries to a search engine; and
a module for filtering results received from the search engine to remove any hits that resulted from the set of securing search queries.

8. The computer system of claim 7, further comprising:
a module for randomly choosing keywords related to the subject matter; and
a module for creating at least one combination of the keywords.

9. The computer system of claim 8, the keywords being randomly chosen from a database having content related to the subject matter.

10. The computer system of claim 7, further comprising a module for associating each of the set of securing search queries with at least one supplemental requestor.

11. The computer system of claim 10, further comprising a module for returning the hits resulting from the set of securing search queries to a respective one of the at least one supplemental requestor.

12. The computer system of claim 7, further comprising a module for making a requestor of the search query and the set of securing search queries anonymous.

13. A computer readable medium containing a program product for securing search queries, the computer readable medium comprising program code for causing a computer system to:
receive a search query;
analyze the search query to determine a subject matter of the search query;
generate a set of securing search queries that have the subject matter of the search query;
submit the search query and the set of securing search queries to a search engine; and
filter results received from the search engine to remove any hits that resulted from the set of securing search queries.

14. The computer readable medium containing the program product of claim 13, the computer readable medium further comprising program code for causing the computer system to:
randomly choose keywords related to the subject matter; and
create at least one combination of the keywords.

15. The computer readable medium containing the program product of claim 14, the keywords being randomly chosen from a database having content related to the subject matter.

16. The computer readable medium containing the program product of claim 13, the computer readable medium further comprising program code for causing the computer system to associate each of the set of securing search queries with at least one supplemental requestor.

17. The computer readable medium containing the program product of claim 16, the computer readable medium further comprising program code for causing the computer system to return the hits resulting from the set of securing search queries to a respective one of the at least one supplemental requestor.

18. The computer readable medium containing the program product of claim 17, the computer readable medium further comprising program code for causing the computer system to make a requestor of the search queries and the set of securing search queries.

19. A method for deploying a system for securing search queries, comprising;
providing computer infrastructure being operable to:
receive a search query;
analyze the search query to determine a subject matter of the search query;
generate a set of securing search queries that have the subject matter of the search query;
submit the search query and the set of securing search queries to a search engine; and
filter results received from the search engine to remove any hits that resulted from the set of securing search queries.

20. The method of claim 19, the computer infrastructure being further operable to:
randomly choose keywords related to the subject matter; and
create at least one combination of the keywords.

21. The method of claim 20, the keywords being randomly chosen from a database having content related to the subject matter.

22. The method of claim 19, the computer infrastructure being further operable to associate each of the set of securing search queries with at least one supplemental requestor.

23. The method of claim 22, the computer infrastructure being further operable to return the hits resulting form the set of securing search queries to a respective supplemental requestor.

24. The method of claim 19, the computer infrastructure being further operable to make a requestor of the search queries and the set of securing search queries.

* * * * *